J. R. GROVE.
AUTOMATIC REGISTER GAGE AND GRIPPER.
APPLICATION FILED AUG. 10, 1908.
905,869.
Patented Dec. 8, 1908.
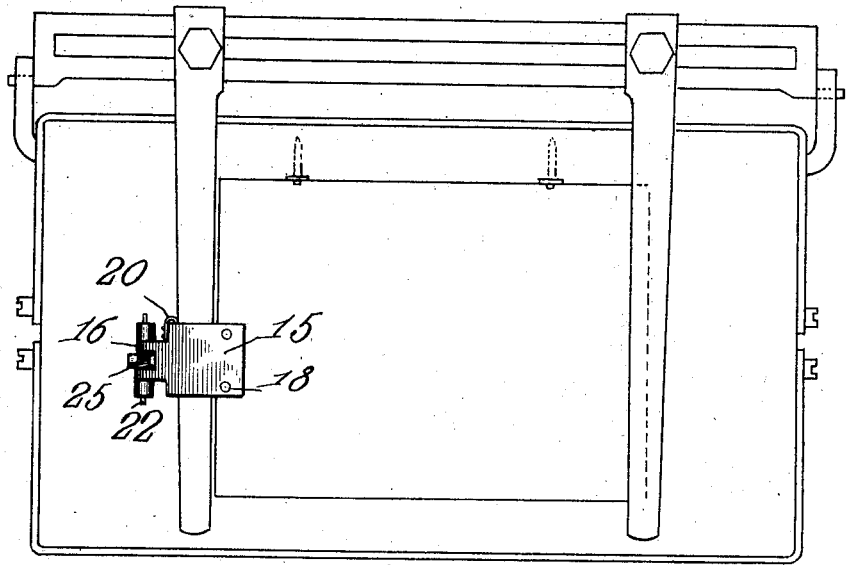
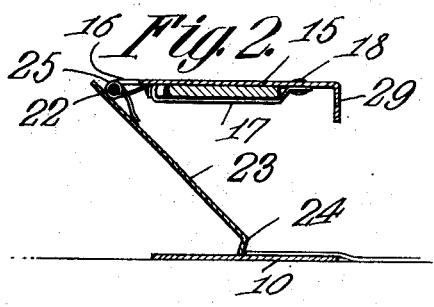
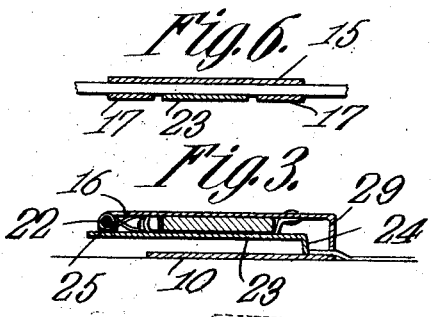
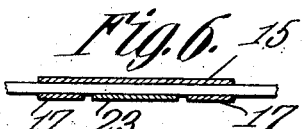
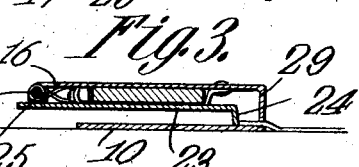
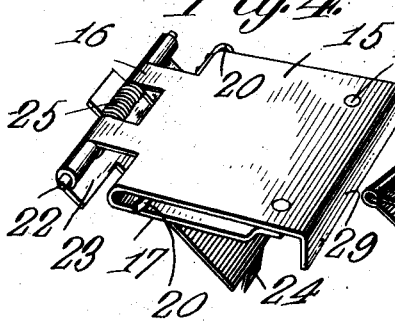
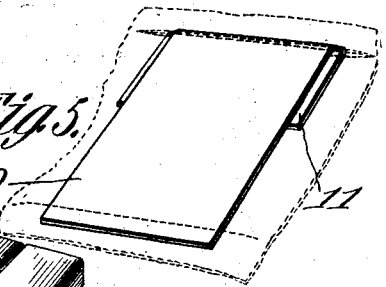
Witnesses
Inventor
Jacob R. Grove
By C. A. Snow & Co.
Attorneys
THE NORRIS PETERS CO., WASHINGTON, D. C.

UNITED STATES PATENT OFFICE.

JACOB ROHR GROVE, OF PHILIPSBURG, PENNSYLVANIA.

AUTOMATIC REGISTER-GAGE AND GRIPPER.

No. 905,869.      Specification of Letters Patent.      Patented Dec. 8, 1908.

Application filed August 10, 1908. Serial No. 447,857.

*To all whom it may concern:*

Be it known that I, JACOB ROHR GROVE, a citizen of the United States, residing at Philipsburg, in the county of Center and State of Pennsylvania, have invented a new and useful Automatic Register-Gage and Gripper, of which the following is a specification.

This invention relates to register gages for printing presses where hand feeding is employed, and has for its principal object to provide a novel form of register gage that will accurately position misplaced sheets.

A further object of the invention is to provide a gage that may be readily and quickly attached to the gripper and tympan without mutilating the latter, and the position of which may be changed in accordance with the size of the sheet and the location of the type.

A still further object of the invention is to provide a gage that occupies a very small space on the press and will not in any manner interfere with the usual work on presses when gages are not used.

A still further object of the invention is to provide a register gage carried by one of the gripper arms of the press.

A still further object of the invention is to provide a device of this kind for holding the left hand side of the sheet to the tympan during the imprinting operation.

A still further object of the invention is to provide a gripper arm carried gage that will serve also as a sheet clamp.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a plan view of the tympan, platen, gripper arm and the register gage forming the subject of the present invention. Fig. 2 is a transverse sectional view through the register gage showing the gage in the position assumed when the platen is open. Fig. 3 is a similar view showing the gage moved for the purpose of adjusting a sheet. Fig. 4 is a perspective view of the gage proper. Fig. 5 is a similar view of the tympan plate used in connection with the gage. Fig. 6 is a vertical sectional view of the slide. Fig. 7 is a detail perspective view illustrating a slight modification of the gage.

Similar numerals of reference are employed to indicate corresponding parts throughout the several figures of the drawings.

The base or tympan plate 10 is formed of sheet metal, one end of the sheet being bent to form a spring arm 11. In attaching the plate two small parallel slits are formed in the tympan sheet and the plain end of the plate 10 is inserted through one slit, while the arm 11 is inserted through the other. This is sufficient to firmly hold the plate in position.

Mounted on the left hand gripper arm is a slide 15 that is formed of a sheet of brass or other metal, one end of the sheet being cut and its central portion bent outward to form a hinge leaf 16, while the strips on the opposite sides of the leaf are bent to form tongues 17 that extend under the gripper arm, the terminals of the tongues being secured to the body of the slide by rivets 18. Between the bent portions of the strips 17 and the adjacent edge of the gripper arm is a small leaf spring 20 which serves as a means for frictionally holding the slide in adjusted position, the spring yielding in order to permit moving of the slide in accordance to the position to which the tympan plate is adjusted.

Connected to the hinge leaf 16 by a pivot pin 22 is a plate 23 having a down turned finger 24 that is held in contact with the tympan plate and which serves as the register gage proper its function being to engage with the edge of a misplaced sheet and move the same over to proper position to receive the imprint. Surrounding the pivot pin 32 is a torsion spring 25 having one end bearing against the hinge leaf 16 and the other against the plate 23. This spring serves to maintain the lower edge of the finger 24 in constant engagement with the tympan sheet.

During the operation of the press the gripper will be moved in the direction of the tympan and the plate 23 will be moved down toward position parallel with the tympan plate. This causes the gage finger to come into contact with a misplaced sheet and the sheet will thereupon be moved over to the gage line at proper position to receive the imprint. As the platen moves to open position the finger will leave the sheet and the plate 23 will again assume the oblique position shown in Fig. 2.

In register gages of this general type where the gage is operated by the gripper arm, the function of the gripper as a sheet engaging member is nullified, and only the right hand gripper engages with the sheet. In order to remedy this defect, the projecting end of the plate 18 is provided with a down turned flange 29 that acts to engage with and hold the sheet against the tympan so that there is no danger of the sheet moving outward while traveling toward the type bed or clinging to the type, after the impress.

In Fig. 7 is shown a slight modification of the structure. In this case the gage is formed of a sheet of metal that is so bent as to encircle the gripper arm to provide the sheet gripping finger and also to form a spring tongue that engages with and moves the sheet over to proper position on the tympan. This gage is preferably formed of a piece of tempered steel, and operates as a flat or coil spring.

What is claimed is:—

1. In combination, a slide formed of a sheet of metal one end of which is bent outward to form a hinge leaf and the side strips being bent to form gripper encircling fingers, a frictional binding spring carried by the same, a plate pivoted to the hinge leaf and terminating in a gage finger, and a spring tending to move the plate to open position.

2. A tympan gage comprising a slide consisting of a plate having at one of its ends spaced return bends, forming gripper encircling fingers, and a gage plate hinged to the said end of the plate between the fingers.

3. A tympan gage comprising a slide having at one end hinge knuckles, and gripper encircling fingers, a gage-plate formed with hinge knuckles, and a pintle passing through the knuckles of the slide and gage plate.

4. A tympan gage comprising a slide having at one end a sheet clamp, and at the other end hinge knuckles and gripper encircling fingers, a gage-plate formed with hinge knuckles, and a pintle passing through the knuckles of the slide and the gage-plate.

In testimony that I claim the foregoing as my own, I have hereto affixed my signature in the presence of two witnesses.

JACOB ROHR GROVE.

Witnesses:
G. T. RUMBERGER,
E. ETHEL GROVE.